(12) United States Patent
Ajichi et al.

(10) Patent No.: US 8,339,539 B2
(45) Date of Patent: Dec. 25, 2012

(54) ILLUMINATION DEVICE AND LIQUID CRYSTAL DISPLAY DEVICE

(75) Inventors: Yuhsaku Ajichi, Osaka (JP); Takeshi Masuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 481 days.

(21) Appl. No.: 12/531,925

(22) PCT Filed: Jul. 16, 2008

(86) PCT No.: PCT/JP2008/062826
§ 371 (c)(1),
(2), (4) Date: Sep. 18, 2009

(87) PCT Pub. No.: WO2009/016965
PCT Pub. Date: Feb. 5, 2009

(65) Prior Publication Data
US 2010/0103349 A1 Apr. 29, 2010

(30) Foreign Application Priority Data
Jul. 27, 2007 (JP) .................. 2007-196666

(51) Int. Cl.
*G02F 1/1335* (2006.01)
*F21V 7/04* (2006.01)
(52) U.S. Cl. ............ 349/64; 362/616; 362/628; 349/63; 349/65
(58) Field of Classification Search ............. 349/62–65; 362/628, 606–607, 613–616, 619, 622
See application file for complete search history.

(56) References Cited

U.S. PATENT DOCUMENTS

| 5,886,759 | A | * | 3/1999 | Mashino et al. | 349/65 |
|---|---|---|---|---|---|
| 6,011,602 | A | * | 1/2000 | Miyashita et al. | 349/65 |
| 6,241,358 | B1 | | 6/2001 | Higuchi et al. | |
| 2002/0197051 | A1 | | 12/2002 | Tamura et al. | |
| 2006/0221638 | A1 | * | 10/2006 | Chew et al. | 362/613 |
| 2007/0091641 | A1 | | 4/2007 | Lin et al. | |
| 2008/0089091 | A1 | * | 4/2008 | Matsushita | 362/603 |

FOREIGN PATENT DOCUMENTS

| JP | 2002-109934 | 4/2002 |
|---|---|---|
| JP | 2006-108033 | 4/2006 |
| JP | 2006-190602 | 7/2006 |
| JP | 2006-302687 | 11/2006 |
| JP | 2007-165336 | 6/2007 |
| WO | WO 2007/052842 | 5/2007 |

OTHER PUBLICATIONS

International Search Report for PCT/JP2008/062826 mailed Aug. 12, 2008.

* cited by examiner

*Primary Examiner* — Mark Robinson
*Assistant Examiner* — Charles Chang
(74) *Attorney, Agent, or Firm* — Nixon & Vanderhye P.C.

(57) ABSTRACT

A backlight (illumination device) 2 is disclosed including: light sources (5); light guide plates (7) for causing surface emission of light from the light sources (5); and a diffusing plate (8) for diffusing light from the light guide plates (7), the diffusing plate (8) facing a light-emitting surface (7a) of each of the light guide plates (7) at a predetermined distance. The illumination device further includes at least one maintaining section between the light-emitting surface (7a) of the light guide plate (7) and the diffusing plate (8), the maintaining section (10) maintaining the predetermined distance. The maintaining section (10) is provided on either of first and second end sections of the light-emitting surface (7a) of a light guide plate (7), the first end section being closer to a corresponding light source (5), the second end section being farther from the corresponding light source (5).

10 Claims, 13 Drawing Sheets

ILLUMINATION DEVICE AND LIQUID CRYSTAL DISPLAY DEVICE

This application is the U.S. national phase of International Application No. PCT/JP2008/062826 filed 16 Jul. 2008 which designated the U.S. and claims priority to Japanese Patent Application No. 2007-196666 filed 27 Jul. 2007, the entire contents of each of which are hereby incorporated by reference.

TECHNICAL FIELD

The technology presented herein relates to an illumination device used, for example, as a backlight of a liquid crystal display device, and also relates to a liquid crystal display device including the illumination device.

BACKGROUND AND SUMMARY

Liquid crystal display devices have become rapidly popular in place of cathode ray tube (CRT) based display devices in recent years. The liquid crystal display devices have been in widespread use in liquid crystal televisions, monitors, mobile phones, and the like, which take advantage of, e.g., energy saving, thin, and lightweight features of the liquid crystal display devices. One way to further take advantage of such features is to improve an illumination device (i.e., a so-called backlight) which is provided behind the liquid crystal display device.

The illumination devices are roughly classified into a side light type (also referred to as an edge light type) and a direct type. The side light type is configured such that a light guide plate is provided behind a liquid crystal display panel and that a light source is provided at a lateral edge of the light guide plate. Light emitted from the light source is reflected by the light guide plate, so as to irradiate the liquid crystal display panel indirectly and uniformly. With this configuration, it is possible to realize an illumination device which has a reduced thickness and excellent luminance uniformity, although its luminance is low. For this reason, the side light type illumination device is mainly used in medium- to small-size liquid crystal displays such as a mobile phone and a laptop personal computer.

One example of the side light type illumination device is the one disclosed in Patent Literature 1. Patent Literature 1 discloses a surface-emitting device in which a reflecting surface of a light guide plate is provided with a plurality of dots for the purpose of allowing for uniform light emission from a light-emitting surface. In this surface-emitting device, light is not transmitted to a corner section of the reflecting surface due to directivity of a light source, and thereby the corner section of the reflecting surface is darkened. In order to deal with this, the corner section has a higher dot-density compared with other sections.

The direct type illumination device is provided with a plurality of light sources aligned behind a liquid crystal display panel, so as to directly irradiate the liquid crystal display panel. This makes it easier to obtain a high luminance even with a large screen. On this account, the direct type illumination device is mainly employed in a large liquid crystal display of 20 inches or more. However, a currently-available direct type illumination device has a thickness of as much as approximately 20 mm to approximately 40 mm, and this becomes an obstacle to a further reduction in a thickness of the display.

The further reduction in the thickness of the large liquid crystal display can be achieved by shortening a distance between the light source and the liquid crystal display panel. In this case, however, it is impossible for the illumination device to achieve luminance uniformity unless the number of light sources is increased. However, increasing the number of light sources increases a cost. In view of this, there is a need for developing an illumination device which is thin and has excellent luminance uniformity, without increasing the number of light sources.

Conventionally, in order to solve these problems, such an attempt has been conducted that a plurality of side light type illumination devices are aligned and thereby the thickness of the large liquid crystal display is reduced.

For example, Patent Literature 2 proposes a planar light source device that can secure a wide light-emitting area with a compact structure and therefore can be suitably used in a large liquid crystal display. This planar light source device has a tandem structure in which board-shaped light guide blocks are aligned tandemly and each of the light guide blocks is provided with a first light source for supplying each of the light guide blocks with first light.

An illumination device configured, as described above, such that a plurality of light-emitting units each of which is made by a combination of a light source and a light guide plate are aligned is called a tandem type illumination device.

Citation List

Patent Literature 1

Japanese Patent Application Publication, Tokukai, No. 2003-43266 (Publication Date: Feb. 13, 2003)

Patent Literature 2

Japanese Patent Application Publication, Tokukaihei, No. 11-288611 (Publication Date: Oct. 19, 1999)

Patent Literature 3

Japanese Patent Application Publication, Tokukai, No. 2006-302687 (Publication Date: Nov. 2, 2006)

SUMMARY OF INVENTION

However, in the illumination device configured by the combination of the light guide plates and the light sources as described above, aligning the plurality of light guide plates planerly poses such a problem that luminance still becomes non-uniform because of (i) luminance unevenness caused, by joints between the light guide plates and (ii) in-plane light non-uniformity occurring in light-emitting surfaces of the light guide plates.

In order to deal with this, for example in the planar light source device disclosed in Patent Literature 2, a gap is provided between the light guide plate and a diffusing plate. Light emitted from the light guide plate reaches the diffusing plate while overlapping one another in multiple directions. Therefore, increasing a distance between the light guide plate and the diffusing plate allows the light emitted onto the diffusing plate to be averaged, thereby making it possible to reduce the above-mentioned luminance non-uniformity.

However, since the above configuration is such that the gap is simply provided between the light guide plate and the diffusing plate, the light guide plate and the diffusing plate are bent due to heat generated in the light source and a force applied externally. This causes the distance between the light guide plate and the diffusing plate non-constant, thereby impairing luminance uniformity.

In order to deal with this, for example, Patent Literature 3 discloses such a configuration that a protruding section is provided between a light guide plate and a diffusing plate so that a distance between the two is maintained. This prevents the bending of the light guide plate and therefore the distance is maintained, thereby making it possible to maintain luminance uniformity.

The protruding section disclosed in Patent Literature 3, however, is made only for the purpose of maintaining the distance between the light guide plate and the diffusing plate, and is not made in consideration of a position at which the protruding section is provided. Thus, the following problem occurs: Light emitted from the light-emitting surface of the light guide plate is reflected by the protruding section, thereby leading to luminance unevenness and non-uniform light emission. Using such an illumination device as a backlight in a display device impairs display quality.

The present technology was made in view of the foregoing problems, and a feature of the present technology is to provide an illumination device which maintains a distance between a light guide plate and a diffusing plate and further improves its luminance uniformity.

In order to attain the above feature, an illumination device of an example embodiment presented herein includes: a plurality of light sources; a plurality of light guide plates for causing surface emission of light from the plurality of light sources, respectively; and a diffusing plate for diffusing light from the plurality of light guide plates, the diffusing plate being provided so as to be away, by a predetermined distance, from and face a light-emitting surface formed of the plurality of light guide plates, each of the plurality of light guide plates including: a light-emitting section having a part of the light-emitting surface; and a light guide section for guiding, to the light-emitting section, light from a corresponding one of the plurality of light sources, a light-emitting section of one of any adjacent two of the plurality of light guide plates being provided above a light guide section of the other of any adjacent two of the plurality of light guide plates, at least one maintaining section being provided between the light-emitting surface and the diffusing plate, the at least one maintaining section maintaining the predetermined distance, the at least one maintaining section being provided on a first end section or a second end section of each of the parts forming the light-emitting surface, the first end section being closer than the second end section to a corresponding light source, the second end section being farther than the first end section from the corresponding light source.

The above arrangement causes the maintaining section in a tandem-type illumination device to be placed on either of first and second end sections of the light-emitting surface of each light guide plate, the first end section being closer than the second end section to a corresponding one of the plurality of light sources, the second end section being farther than the first end section from the corresponding one of the plurality of light sources.

In general, the amount of light transmitted through the light guide plate attenuates as the light travels farther away from its light source. This leads to a small amount of light, as compared to other regions, emitted from the end section of the light-emitting surface of the light guide plate, the end section being opposite from the light source (i.e., emitted from the second end section that is farther than the first end section from the corresponding one of the plurality of light sources).

Further, the above arrangement causes the light-emitting section of one of any two adjacent light guide plates to be placed over the light guide section of the other of the two adjacent light guide plates. The above arrangement also maintains the distance between each light guide plate and the diffusing plate. This allows the light guide plates to collectively form a flush light-emitting surface. Thus, the light-emitting section has a thickness different from that of the light guide section at least at the connection between them. This forms a step section at the connection between the light guide section and the light-emitting section of each light guide plate (i.e., at the first end section that is closer than the second end section to the corresponding one of the plurality of light sources). This further forms a dark section (dead space) that impedes the arrival of light transmitted through the light guide section at the light-emitting surface.

As described above, the light-emitting region of the light-emitting surface includes two regions each emitting a small amount of light: a region far from the light source and a region close to the light source. Thus, providing the maintaining section in either of the above regions not only maintains the distance between the light-emitting surface and the diffusing plate, but also reduces the proportion of light emitted from the light-emitting surface, the proportion being reflected by the maintaining section. This in turn reduces luminance unevenness caused by light reflected by the maintaining section. This consequently further improves luminance uniformity in comparison with conventional arrangements.

The illumination device of the present embodiment may be arranged such that the at least one maintaining section is provided on the first end section.

As described above, the end section of the light-emitting surface of each light guide plate, the end section being closer than the other end section to the light source, corresponds to the dark section that impedes the arrival of light at the light-emitting surface. Therefore, the amount of light emitted from the light-emitting surface in the above end section is least in the light-emitting region. Thus, providing the maintaining section on the above end section minimizes the proportion of light emitted from the light-emitting surface, the proportion being reflected by the maintaining section. As a result, the placement of the maintaining section on the above end section allows luminance uniformity to be improved further in comparison with the aforementioned arrangement.

The illumination device of the present embodiment may be arranged such that a plurality of light diffusing means for causing light to be emitted from the light-emitting surface of the plurality of light guide plates are provided on the light-emitting section of each of the plurality of light guide plates; the plurality of light diffusing means are distributed so as to have an area density which varies depending on light emission amount of the light-emitting surface; and the at least one maintaining section is provided on the second end section.

The light diffusing means are distributed over a surface in different densities according to the amount of light emitted from the light-emitting surface of each light guide plate. This, for example, allows a large number of the light diffusing means to be provided in a region emitting a small amount of light and, in contrast, a small number of the light diffusing means to be provided in a region emitting a large amount of light. This consequently improves uniformity in the amount of light emitted onto the diffusing plate.

Further, the maintaining section is provided on the end section farther than the other end section from the light source. Even providing the light diffusing means in the above end section leaves the amount of light emitted from the end section still relatively small. This renders small the proportion of light reflected by the maintaining section.

This further improves luminance uniformity in comparison with the above arrangements.

Further, the provision of the maintaining section on the end section farther than the other end section from the light source also prevents the light guide plate from bending. This surely maintains the distance between the light-emitting surface of the light guide plate and the diffusing plate, and thereby maintains the diffusion region formed between them. This in turn allows further averaging light to be emitted onto the diffusing plate and thereby improves luminance uniformity.

In order to attain the above feature, an illumination device of the present embodiment includes: at least one light source; at least one light guide plate for causing surface emission of light from the at least one light source; and a diffusing plate for diffusing light from the at least one light guide plate, the diffusing plate being provided so as to be away, by a predetermined distance, from and face a light-emitting surface formed of the at least one light guide plate, a maintaining section, which maintains the predetermined distance, being provided on a portion of a light-emitting region of the light-emitting surface, the portion having a least light emission amount.

According to the above arrangement, the maintaining section is provided on a portion of the light-emitting region of the light-emitting surface of the light guide plate, the portion emitting the least light. This allows light emitted from the light-emitting surface to be least influenced by the maintaining section. In other words, the above arrangement minimizes the proportion of light emitted from the light-emitting surface, the proportion being reflected by the maintaining section. In addition, the maintaining section maintains the distance between the light-emitting surface of the light guide plate and the diffusing plate. This reduces luminance unevenness caused by light reflected by the maintaining section. This in turn further improves luminance uniformity in comparison with conventional arrangements.

Note that the portion of the light-emitting surface of the light guide plate, the portion emitting the least light, refers, for example, to: the end section of the light-emitting surface, the end section being farthest from the light source; or to a region of the light-emitting surface, the region being a region which light emitted from the light source is difficult to reach.

The illumination device of the present embodiment may be arranged such that a plurality of light diffusing means for causing light to be emitted from the light-emitting surface of the light guide plate are provided on the light-emitting section; and the plurality of light diffusing means are distributed so as to have an area density which varies depending on light emission amount of the light-emitting surface.

As indicated above, a large number of the light diffusing means are provided in a region emitting a small amount of light, whereas a small number of the light diffusing means are provided in a region emitting a large amount of light. This improves uniformity in the amount of light emitted onto the diffusing plate. This in turn further improves luminance uniformity.

The illumination device of the present embodiment may be arranged such that the at least one maintaining section is provided so as to be integrated with (i) the light guide plate or (ii) the diffusing plate.

This eliminates the need to produce the maintaining section as a separate member and thereby reduces the number of production steps. This in turn improves production efficiency.

A liquid crystal display device of the present embodiment includes any of the above the illumination devices as a backlight.

According to the above arrangement, the inclusion of one of the illumination devices of the present invention allows for production of a liquid crystal display device having superior luminance uniformity.

Additional, features, and strengths of the present embodiment will be made clear by the description below. Further, the advantages of the present embodiment will be evident from the following explanation in reference to the drawings.

DESCRIPTION OF EMBODIMENTS

One embodiment of the present technology is described below with reference to FIGS. 1 through 17. Note that the present technology is not limited to this.

The present embodiment describes an illumination device used as a backlight of a liquid crystal display device.

Figure 1:
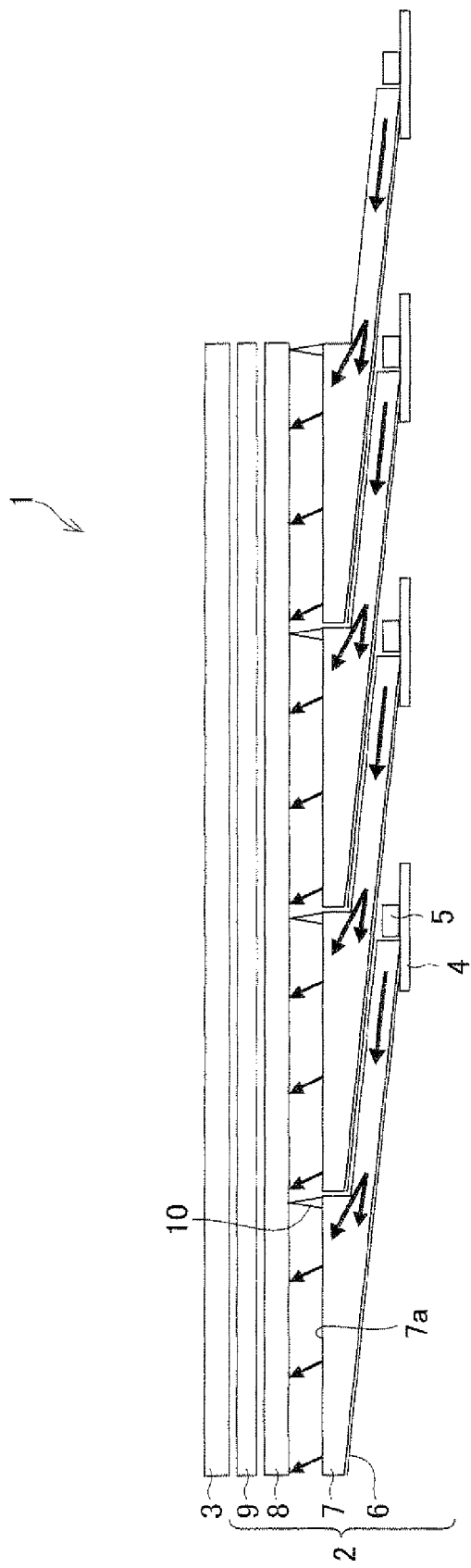
FIG. 1 is a cross-section view schematically illustrating the configuration of a liquid crystal display device in accordance with an embodiment.

FIG. 1 is a cross-section view schematically illustrating a configuration of a liquid crystal display device 1 according to the present embodiment. The liquid crystal display device 1 includes a backlight 2 (illumination device) and a liquid crystal display panel 3 provided so as to face the backlight 2.

The liquid crystal display panel 3 is similar to a generally-used liquid crystal display panel used in a conventional liquid crystal display device. For example, the liquid crystal display panel 3 is configured so as to include: an active matrix substrate on which a plurality of TFTs (thin film transistors) are formed; and a CF substrate facing the active matrix substrate, and further to include a liquid crystal layer sealed between the active matrix substrate and the CF substrate by means of a sealing material, although they are not illustrated.

A configuration of the backlight 2 provided in the liquid crystal display device 1 is described in detail below.

The backlight 2 is provided behind the liquid crystal display panel 3 (on an opposite side of a display surface). As shown in FIG. 1, the backlight 2 includes a substrate 4, a light source 5, a reflecting sheet 6, a light guide plate 7, a diffusing plate 8, an optical sheet 9, and a maintaining section 10.

The light source 5 is, for example, a side light-emitting type light-emitting diode (LED) or a cold cathode fluorescent tube (CCFL). Description herein deals with, as one example, an LED as the light source 5. By using, as the light source 5, the side light-emitting type LED including chips of R, G, and B molded into one package, it is possible to achieve an illumination device capable of a wide range of color reproduction. Note that the light source 5 is provided on the substrate 4.

The light guide plate 7 causes surface emission of light from a light-emitting surface 7a, the light having been emitted from the light source 5. The light-emitting surface 7a is a surface for emitting light toward an irradiation object. In the present embodiment, the light guide plates 7 employ a tandem configuration as shown in FIG. 1. That is, the light guide plates 7 are arranged such that: (i) each light guide plate 7 includes (a) a light-emitting section 7b including the light-emitting surface 7a and (b) a light guide section 7c for directing, to the light-emitting section 7b, light emitted from the light source 5; (ii) the light-emitting section 7b and the light guide section 7c have different thicknesses at least at a connection therebetween; and (iii) the light-emitting section 7b of one light guide plate 7 is placed on the light guide section 7c of another light guide plate 7. Thereby, a flush light-emitting surface is formed by a plurality of light guide plates (see FIGS. 1 and 2).

Figure 2:
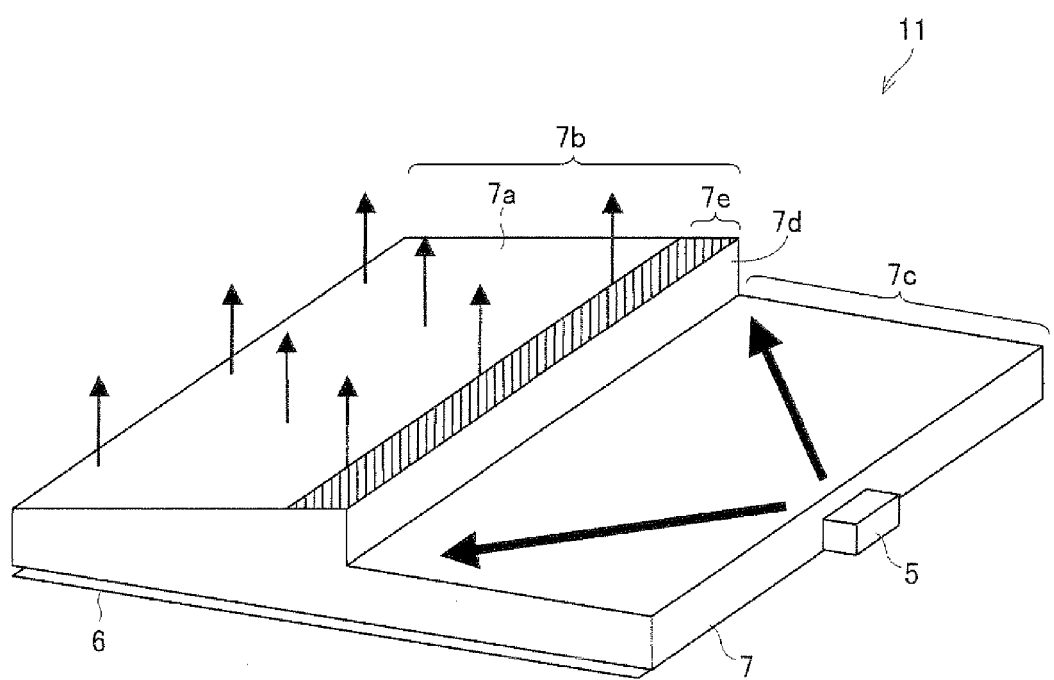
FIG. 2 is a perspective view schematically illustrating the configuration of a light guide plate unit included in the liquid crystal display device.

FIG. 2 is a perspective view schematically illustrating a configuration of a light guide plate unit 11 included in the liquid crystal display device 1 shown in FIG. 1. The light guide plate unit 11 diffuses light emitted from the light source 5 for the purpose of emitting, in a form of plane emission, the light. The light guide plate unit 11 includes the light source 5, the substrate 4 (FIG. 1), the reflecting sheet 6, and the light guide plate 7. As shown in FIG. 2, light emitted from the light source 5 enters the light guide section 7c of the light guide plate 7, is transmitted through the light guide section 7c, and then reaches the light-emitting section 7b. A surface (light-emitting surface 7a) or a back surface of the light-emitting section 7b of the light guide plate 7 has been subjected to a process or a treatment each of which is for causing light which has been guided thereto to be emitted toward a front surface, although they are not illustrated. Thereby, the light is emitted from the light-emitting surface 7a of the light guide plate 7 toward the liquid crystal display panel 3. Examples of a specific method for the process or the treatment applied to the light-emitting section 7b of the light guide plate 7 encompass prism processing, texturing, and print processing. However, this method is not particularly limited, and may use a publicly-known method as needed.

Further, the light guide plate 7 is mainly made from a transparent resin such as a PMMA or a polycarbonate. However, the material is not particularly limited, but may preferably be a material having a high light transmittance.

Furthermore, the light guide plate 7 may be formed by means of, for example, injection molding or extrusion molding, hot-press molding, or cutting. However, the present invention is not particularly limited to these forming methods, and may use any processing method as long as it provides a similar property.

The reflecting sheet 6 is provided in contact with the back surface (a surface opposite to the light-emitting surface 7a) of the light guide plate 7. The reflecting sheet 6 reflects light so as to allow the light-emitting surface 7a to emit a larger amount of light.

The diffusing plate 8 is so provided as to face the light-emitting surface 7a, while covering the whole of the flush light-emitting surface formed by the light-emitting surfaces 7a of the light guide plates 7 and maintaining a predetermined distance from the light-emitting surfaces 7a. The diffusing plate 8 diffuses light emitted from the light-emitting surface 7a of the light guide plate 7 so that the light is emitted onto the optical sheet 9 (described later). The present embodiment uses, as the diffusing plate 8, "SUMIPEX E RMA10" (manufactured by Sumitomo Chemical Co., Ltd.) having a thickness of 2.0 mm. Further, the above-mentioned predetermined distance is set to 3.0 mm.

The maintaining section 10 maintains the distance between the light-emitting surface 7a of the light guide plate 7 and the diffusing plate 8. In the present embodiment, a height of the maintaining section 10 is set to 3.0 mm so that the foregoing predetermined distance is set to 3.0 mm. Note that the maintaining section 10 may preferably be made from a resin such as a polycarbonate, as well as the light guide plate 7 and the diffusing plate 8. Further, the shape of the maintaining section 10 is not particularly limited; however, the maintaining section 10 preferably has a tapering shape such as a circular cone so as not to block light emitted from the light-emitting surface 7a of the light guide plate 7. The specific position of the maintaining section 10 on the light-emitting surface 7a of the light guide plate 7 will be described later.

The optical sheet 9 is made of a plurality of sheets stacked on one another so placed as to face the front surface of the light guide plate 7. The optical sheet 9 uniforms and focuses light emitted from the light-emitting surface 7a of the light guide plate 7 so as to emit the light toward the liquid crystal display panel 3. That is, the followings may be applied to the optical sheet 9: a diffusing sheet for diffusing light while focusing the light; a lens sheet for focusing light so as to improve luminance in a front direction (a direction toward the liquid crystal display panel 3); and a polarizing and reflecting sheet for reflecting a polarizing component of light and transmitting another polarizing component so as to improve luminance of the liquid crystal display device 1. It is preferable that these should be used in combination as needed according to a price or a performance of the liquid crystal display device 1. In the present embodiment, as one example, "LIGHT-UP 250GM2" (manufactured by Kimoto Co., Ltd.) and/or the like is used as the diffusing sheet, "Thick RBEF" (manufactured by Sumitomo 3M Ltd.) and/or the like is used as a prism sheet (lens sheet), and "DBEF-D400" (manufactured by Sumitomo 3M Ltd.) and/or the like is used as a polarizing sheet (polarizing and reflecting sheet).

With the foregoing configuration of each member, light emitted from the light source 5 is transmitted through the light guide plate 7 while being subjected to a scattering effect and a reflecting effect as shown in FIG. 2, and is emitted from the light-emitting surface 7a. Then, the light goes through the diffusing plate 8 and the optical sheet 9, so as to reach the liquid crystal display panel 3.

(Luminance Uniformity)

Figure 3:
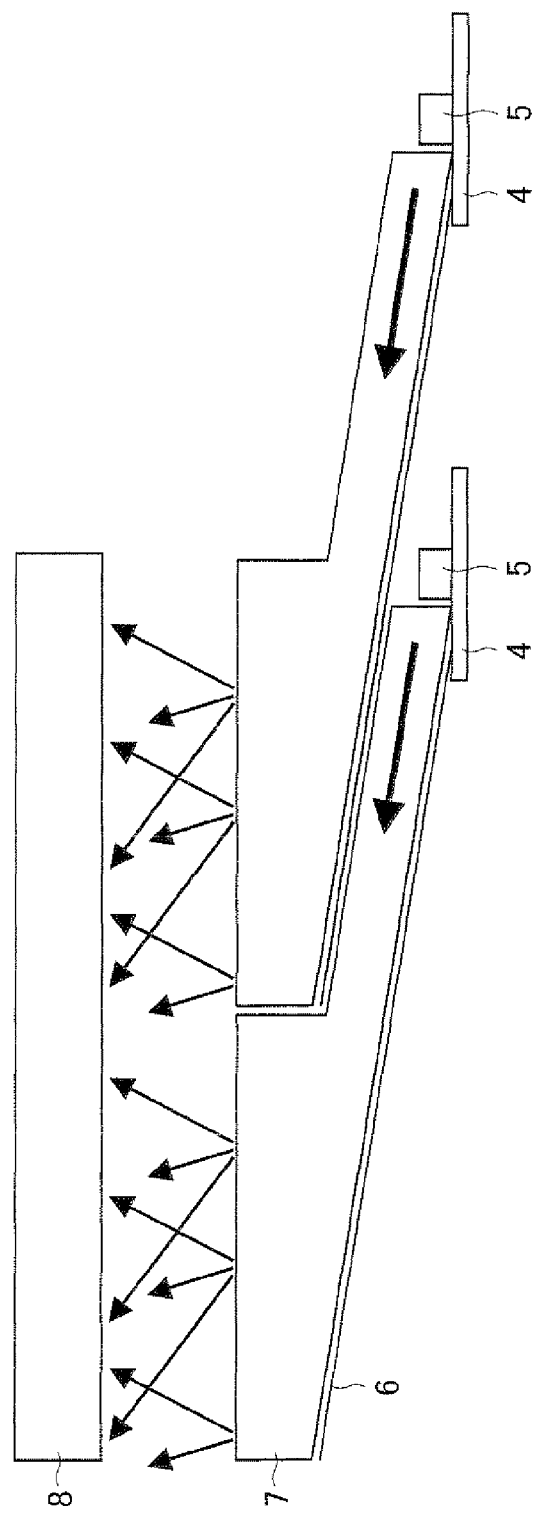
FIG. 3 is a view schematically illustrating the traveling directions of light emitted from the light-emitting surface of a light guide plate shown in FIG. 1.

Here, a principle that luminance becomes non-uniform is described below with reference to FIGS. 2 through 4.

FIG. 2 illustrates how light emitted from the light source 5 is transmitted through the light guide plate 7. As shown in FIG. 2, the light emitted from the light source 5 enters the light guide section 7c of the light guide plate 7 at a certain critical angle. The light which has entered the light guide section 7c radially diffuses inside the light guide section 7c, and then reaches the light-emitting section 7b. Then, the light is reflected by the reflecting sheet 6 provided on the back surface of the light-emitting section 7b, thereby being emitted from the light-emitting surface 7a. In general, there is such a tendency that the amount of light is reduced as light goes far from the light source 5. Therefore, a region in the light guide plate 7, the region corresponding to the end section opposite from the light source 5, has a smaller amount of light than other regions.

Further, a step section 7d is formed at a boundary region between the light guide section 7c and the light-emitting section 7b in the light guide plate 7, because the light guide section 7c and the light-emitting section 7b have different thicknesses. This forms a dark section 7e (a shaded area in FIG. 2; a dead space) in the light-emitting surface 7a, the dark section 7e being an area which light is difficult to reach. Therefore, the dark section 7e region also has a smaller amount of light. Thus, the amount of light varies depending on a position in the light-emitting surface 7a. This causes non-uniform luminance.

Further, in a case of the tandem configuration as in the present embodiment, luminance unevenness occurs due to a joint between the light guide plates 7. Specifically, in the tandem configuration, the light-emitting section 7b of the light guide plate 7 is often so manufactured as to have a length with a minus tolerance. This is for the purpose of preventing any light guide plate 7 from being placed on another light guide plate 7 to an excess degree when these light guide plates 7 are overlapped with each other. This creates a gap corresponding to the tolerance between the light-emitting section 7b of one light guide plate 7 and that of another light guide plate adjacent to the foregoing light guide plate 7. Thus, when a light guide plate on the near side (i.e., on the right side in FIG. 2) emits light from the surface of the end section opposite from the light source 5, the light is divided into: light entering an adjacent light guide plate 7 (positioned on the left side in FIG. 2); and light traveling upward without entering the adjacent light guide plate 7. The light traveling upward then appears as a bright line, thereby giving a great effect on luminance unevenness.

Thus, due to the configuration specific to the light guide plate 7, luminance uniformity is impaired. In order to overcome the luminance non-uniformity, conventionally, the following method has been conducted: A maintaining section is provided between the light-emitting surface 7a and the diffusing plate 8 which maintaining section maintains a constant distance between the two. Thereby, light emitted from the light-emitting surface 7a is diffused and thereby is averaged. FIG. 3 is a view schematically illustrating the traveling directions of light emitted from the light-emitting surface 7a. As shown in FIG. 3, increasing the distance between the light-emitting surface 7a and the diffusing plate 8 enables the diffusing plate 8 to be uniformly irradiated with light emitted from the light-emitting surface 7a. The conventional maintaining section, however, is randomly positioned on the light-emitting surface 7a, and may therefore be positioned in an area between the light-emitting surface 7a and the diffusing plate 8, the area being an area through which light travels. This may prevent light from traveling through such an area. This in turn poses such a problem that luminance changes in an area where the maintaining section is provided and thereby luminance unevenness occurs.

In view of this, the present embodiment not only provides the maintaining section 10 on the light-emitting surface 7a so as to maintain a predetermined distance between the light-emitting surface 7a and the diffusing plate 8, but also specifies the position of the maintaining section 10 on the light-emitting surface 7a. The specific position of the maintaining section 10 will be described below.

(Arrangement of the Maintaining Section 10)

Figure 4:
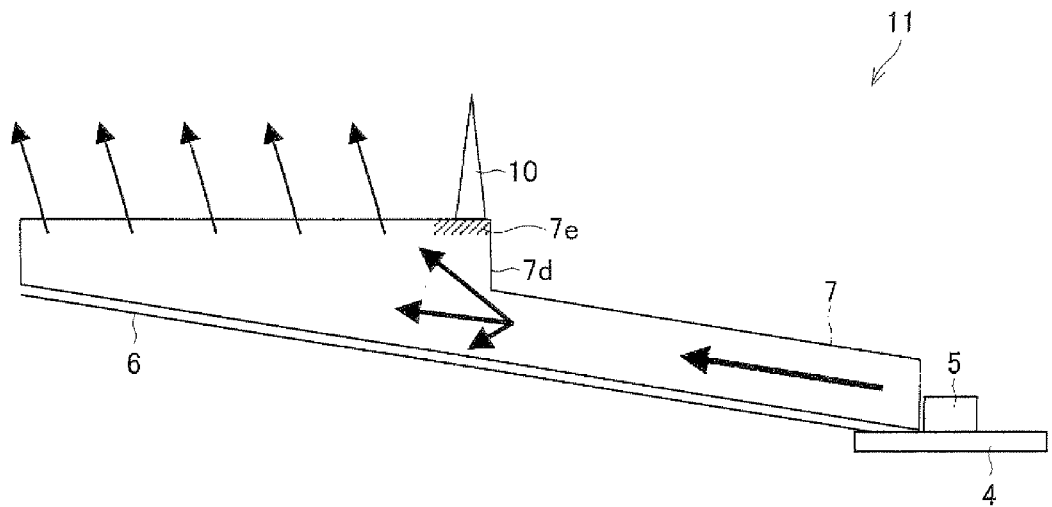
FIG. 4 is a cross-section view schematically illustrating the configuration of a light guide plate unit included in the liquid crystal display device shown in FIG. 1.
Figure 5:
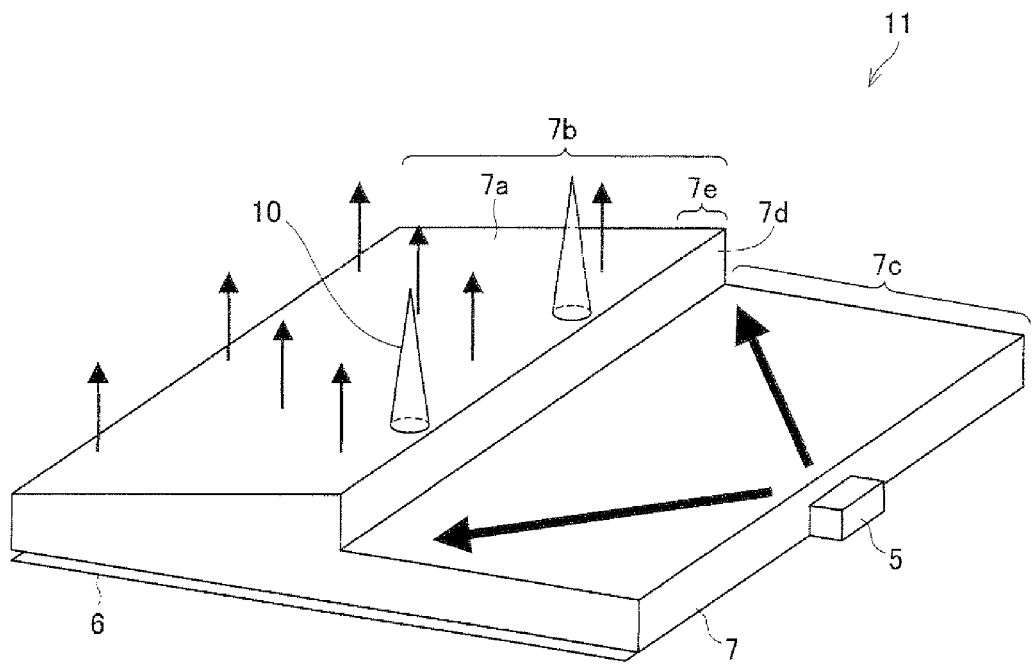
FIG. 5 is a perspective view schematically illustrating the configuration of the light guide plate unit shown in FIG. 4.

As shown in FIGS. 1, 4, and 5, the maintaining section 10 is positioned on a portion of the light-emitting surface 7a, the portion corresponding to the step section 7d formed at the connection between the light-emitting section 7b and the light guide section 7c, i.e., the maintaining section 10 is positioned on the dark section 7e (the shaded portion in FIG. 4). According to the tandem configuration, the light-emitting section 7b and the light guide section 7c have different thicknesses at least at the connection between them. As shown in FIG. 2, this forms the dark section (dead space) 7e in the portion of the light-emitting surface 7a, the portion corresponding to the step section 7d formed at the connection. The dark section 7e is a section which light transmitted from the light guide section 7c is difficult to reach.

The above arrangement causes the maintaining section 10 to be placed in a region (i.e., the dark section 7e) of the light-emitting surface 7a, the region receiving a small amount of light. This allows a reduction in the proportion of light influenced by the maintaining section 10, that is, the proportion reflected by the maintaining section 10. This in turn reduces luminance unevenness in comparison with conventional arrangements and therefore further improves luminance uniformity.

Figure 6:
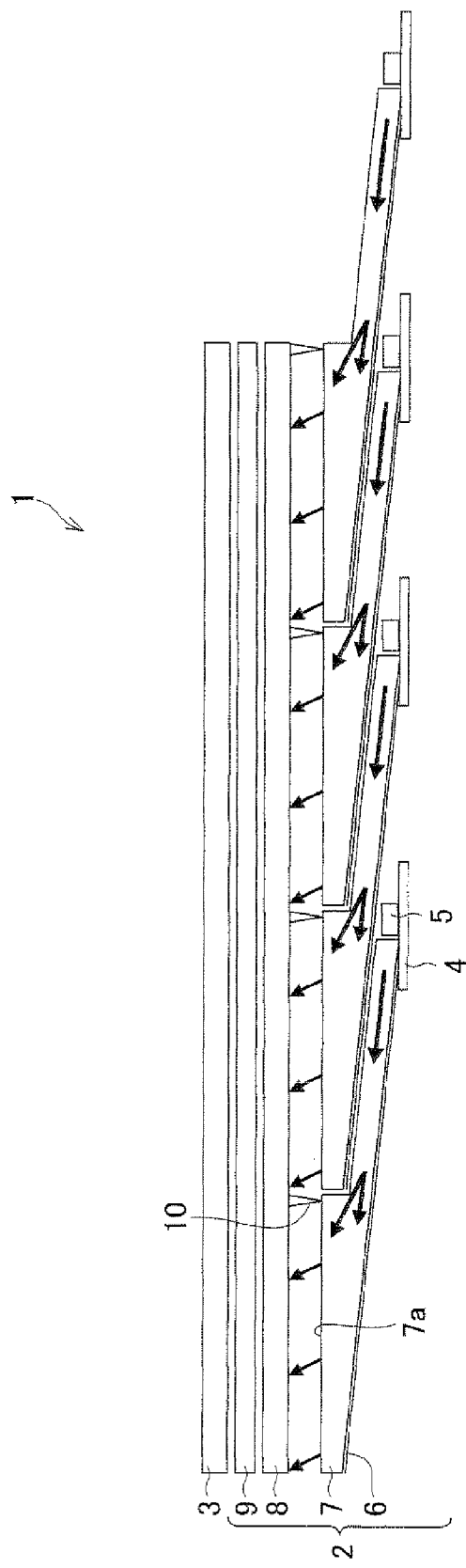
FIG. 6 is a cross-section view schematically illustrating the configuration of a liquid crystal display device including maintaining sections fixed to a diffusing plate.

The maintaining section 10 may be formed integrally with the light guide plate 7 or, as shown in FIG. 6, with the diffusing plate 8. Alternatively, the maintaining section 10 may be produced as a separate member and simply placed on the light guide plate 7. Further alternatively, the maintaining section 10 may be produced as a separate member and fixedly attached to the light guide plate 7 after the light guide plate 7 is produced.

While the maintaining section 10 is placed on the dark section 7e of the step section 7d in FIGS. 1 and 4, it may also be placed on a region of the light guide plate 7, the region corresponding to the end section opposite from the light source 5 and receiving a small amount of light. This arrangement allows an end section of each light guide plate 7 to be supported by the diffusing plate 8 with use of the maintaining section 10. This prevents each light guide plate 7 from bending at its end section and consequently further improves luminance uniformity.

As described above, the maintaining section 10 of the present embodiment is preferably placed on an end section of the light-emitting surface 7a, i.e., either on the end section of the light-emitting surface 7a, the end section being closer than the other end section to the light source 5, or on the end section of the light-emitting surface 7a, the end section being farther than the other end section from the light source 5. More specifically, the above end sections include: both end sections of a complete light-emitting surface formed by the respective light-emitting surfaces 7a of all the light guide plates 7 (e.g., both lateral end sections of the complete light-emitting surface shown in FIG. 1); and the vicinity of the boundary region between the light-emitting section 7b of any light guide plate 7 and the light-emitting section of another light guide plate adjacent to the foregoing light guide plate 7.

The following describes variations of the maintaining section 10.

(Variation 1)

Figure 7:
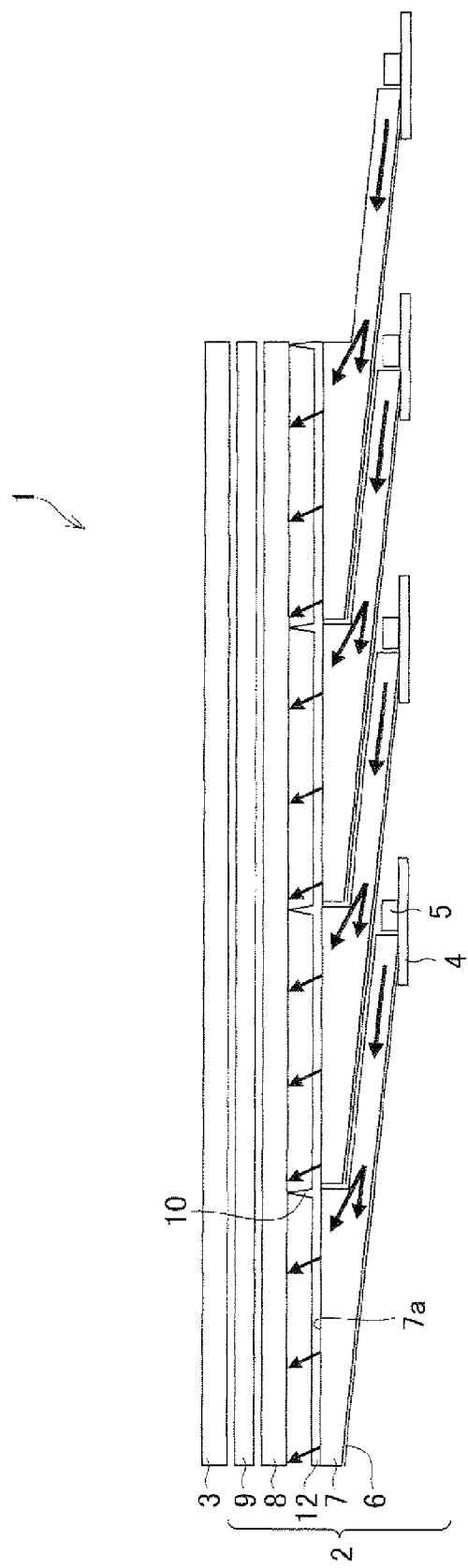
FIG. 7 is a cross-section view schematically illustrating the configuration of a liquid crystal display device including maintaining sections integrally formed with a transparent plate, the liquid crystal display device serving as variation 1.
Figure 8:
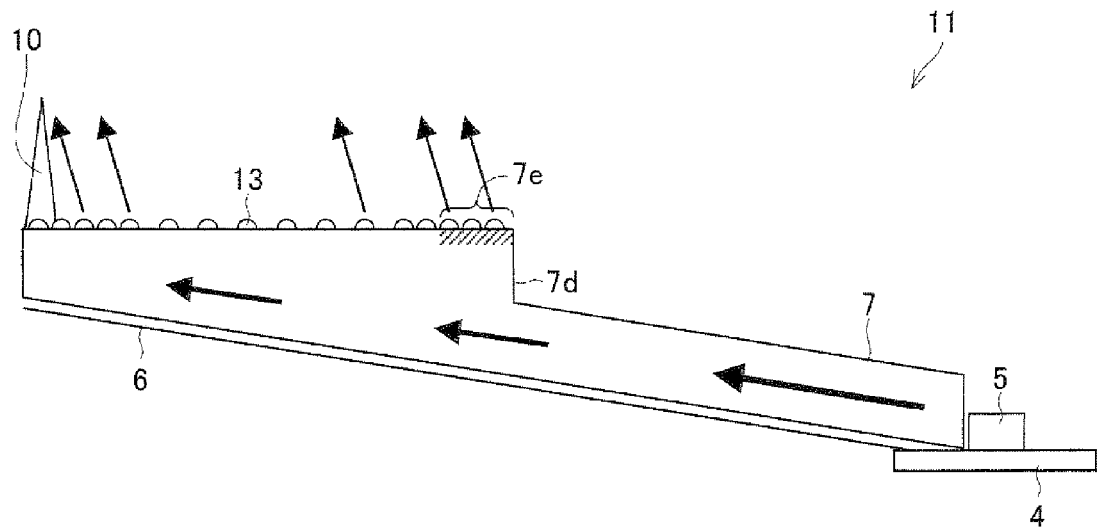
FIG. 8 is a cross-section view schematically illustrating the configuration of a light guide plate unit to be included in the liquid crystal display device shown in FIG. 1, the light guide plate unit serving as variation 2.

FIG. 7 is a cross-section view schematically illustrating the configuration of a liquid crystal display device 1 serving as variation 1. Variation 1 is a variation of the configuration shown in FIG. 1. While the maintaining section 10 is positioned on the dark section 7e as in the configuration of FIG. 1, it is formed integrally with a transparent plate 12 (see FIG. 7). The transparent plate 12 is formed, e.g., of a transparent polycarbonate having a thickness of 1.0 mm. The transparent plate 12 has maintaining sections 10 formed integrally with it and having a height of 2.0 mm.

Variation 1 not only achieves the above-described advantages brought about by the configuration of FIG. 1, but also uses the transparent plate 12 to prevent each light guide plate 7 from being bent by the heat generated by the light source 5. This improves the flatness of the light-emitting surface 7a of the light guide plate 7. This surely maintains the distance between the light-emitting surface 7a of the light guide plate 7 and the diffusing plate 8 and thereby maintains the diffusion region formed between them. This in turn surely allows averaging light to be emitted onto the diffusing plate 8 and thereby improves luminance uniformity.

(Variation 2)

Figure 9:
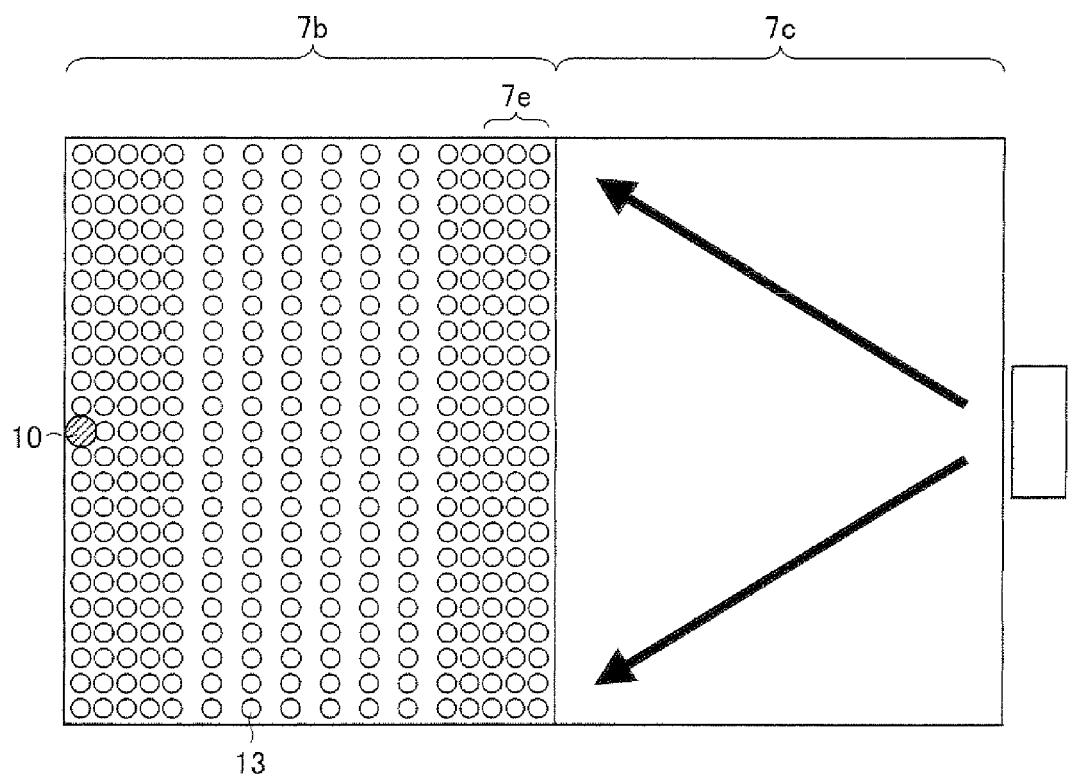
FIG. 9 is a plan view schematically illustrating the configuration of the light guide plate unit shown in FIG. 8.

FIGS. 8 through 11 are each a cross-section view schematically illustrating the configuration of a liquid crystal display device 11 serving as variation 2. Variation 2 includes not only the configuration of FIG. 1 or the configuration of variation 1, but also multiple prisms (light diffusing means) 13 for diffusing light emitted from the light guide plate 7. The prisms 13 are provided at least one of: the light-emitting surface 7a of each light guide plate 7; and the reverse surface of the light guide plate, i.e., the surface opposite from the light-emitting surface 7a (see FIGS. 8 and 10). The prisms 13 are provided over either surface in different distribution densities according to the amount of light emitted from the light-emitting surface 7a of the light guide plate 7. Specifically, as shown in FIG. 9, the prisms 13 are distributed in a low density in a region of the light-emitting surface 7a, the region emitting a large amount of light, and in a high density in a region of the light-emitting surface 7a, the region emitting a small amount of light.

Figure 10:
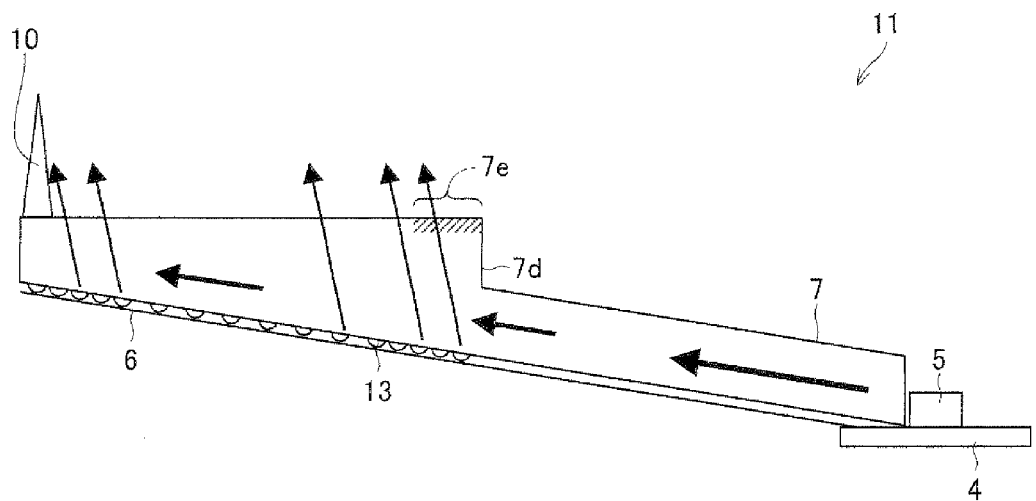
FIG. 10 is a cross-section view schematically illustrating the configuration of a light guide plate unit including a light guide plate provided with prisms on its reverse surface.
Figure 11:
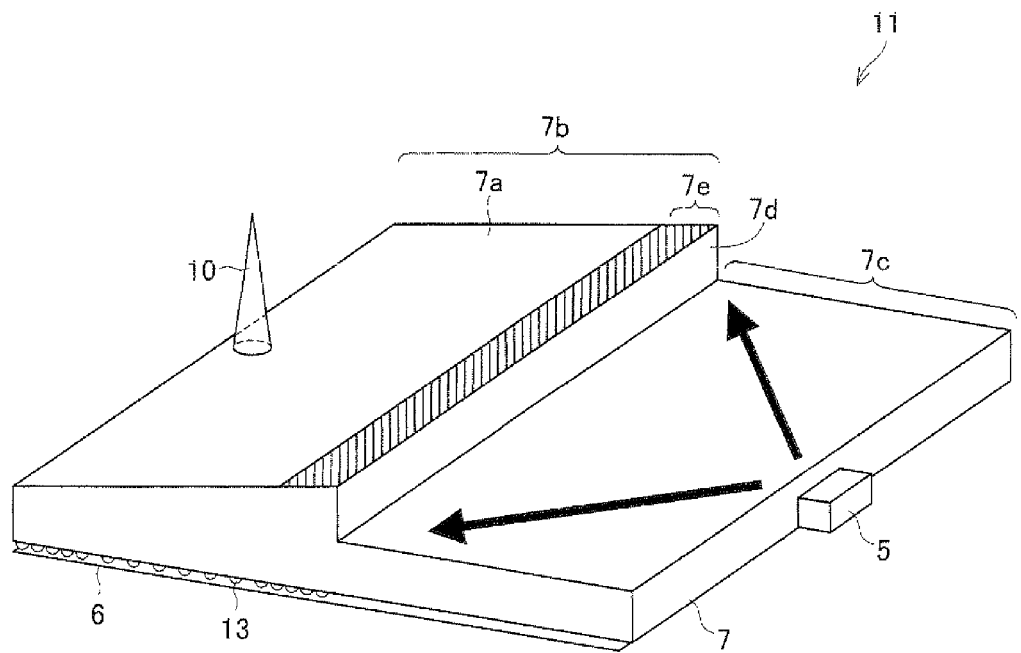
FIG. 11 is a perspective view schematically illustrating the configuration of the light guide plate unit shown in FIG. 10.

FIGS. 10 and 11 each illustrate the prisms 13 provided on a portion of the reverse surface of the light guide plate 7, the portion being opposite from the light-emitting surface 7a.

The provision of the prisms 13 allows light emitted from the light guide plate 7 to be irregularly reflected by the prisms 13 and thereby allows more uniform light to be emitted onto the diffusing plate 8.

Providing the maintaining section 10 in a region of the light-emitting surface 7a, the region having a low distribution density of the prisms 13, i.e., a region emitting a large amount of light, would cause a large amount of light to be reflected by the maintaining section 10, resulting in a high luminance in a portion of the liquid crystal display panel, the portion corresponding to the region in which the maintaining section 10 is provided.

In contrast, according to variation 2, the maintaining section 10 is provided in a region of the light-emitting surface 7a, the region having a high distribution density of the prisms 13, i.e., a region emitting a small amount of light. Specifically, the maintaining section 10 is positioned on at least one of: the dark section 7e corresponding to an upper portion of the step section 7d; and a region corresponding to the end section of the light guide plate 7, the end section being opposite from the light source 5.

Even providing the prisms 13 in such a region still results in a relatively small amount of light emitted from the region. This allows only a small proportion of light emitted from the light-emitting surface 7a to be reflected by the maintaining section 10 provided in the above region. This consequently improves luminance uniformity in comparison with the above arrangements.

The light diffusing means is not limited to prisms. It may be any light diffusing member conventionally used in illumination devices, such as fine asperities (e.g., in a textured shape) and a printed dotted pattern. Further, the light diffusing means may be a member separate from the light guide plate 7 or may be provided within the light guide plate 7.

(Variation 3)

Figure 12:
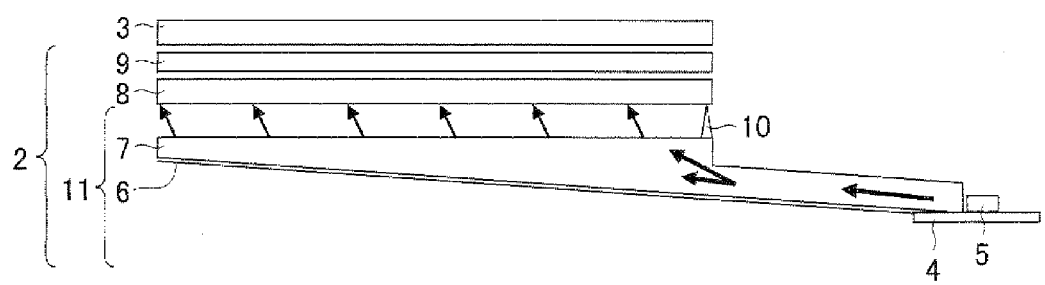
FIG. 12 is a cross-section view schematically illustrating the configuration of a liquid crystal display device including a backlight having a single light guide plate unit, the liquid crystal display device serving as variation 3.
Figure 13:
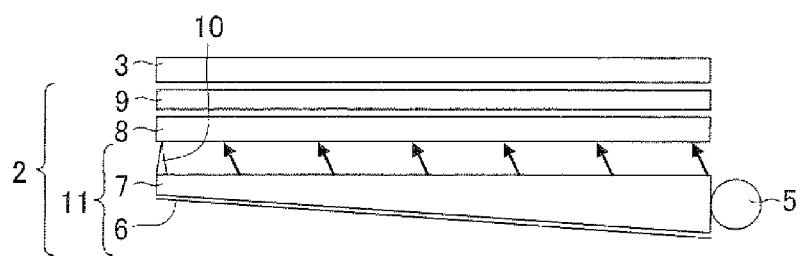
FIG. 13 is a cross-section view schematically illustrating the configuration of the liquid crystal display device serving as variation 3, the liquid crystal display device including a cold cathode fluorescent tube as a light source.

The above description deals with the light guide plates 7 having a tandem configuration. However, the present embodiment not necessarily includes such light guide plates 7; for example, a single light guide plate 7 may be included instead. FIGS. 12 and 13 are each a cross-section view schematically illustrating the configuration of a liquid crystal display device 1 serving as variation 3. FIG. 12 schematically illustrates the configuration of the liquid crystal display device 1 including a backlight 2 having a single light guide plate unit 11.

As shown in FIG. 12, the maintaining section 10 is provided on at least one of: the dark section 7e of the step section 7d, the dark section 7e emitting a small amount of light; and a region corresponding to the end section of the light guide plate 7, the end section being opposite from the light source 5.

FIG. 13 schematically illustrates the configuration of the liquid crystal display device 1 including as the light source 5 a cold cathode fluorescent tube in place of an LED. The use of the cold cathode fluorescent tube as the light source 5 eliminates the need to provide a light guide region (the light guide section 7c) for diffusing light. This allows the light guide plate 7 to be formed in a wedge shape. In this case, it is preferable to position the maintaining section 10 on a region emitting the least amount of light, the region corresponding, e.g., to the end section opposite from the light source 5.

Figure 14:
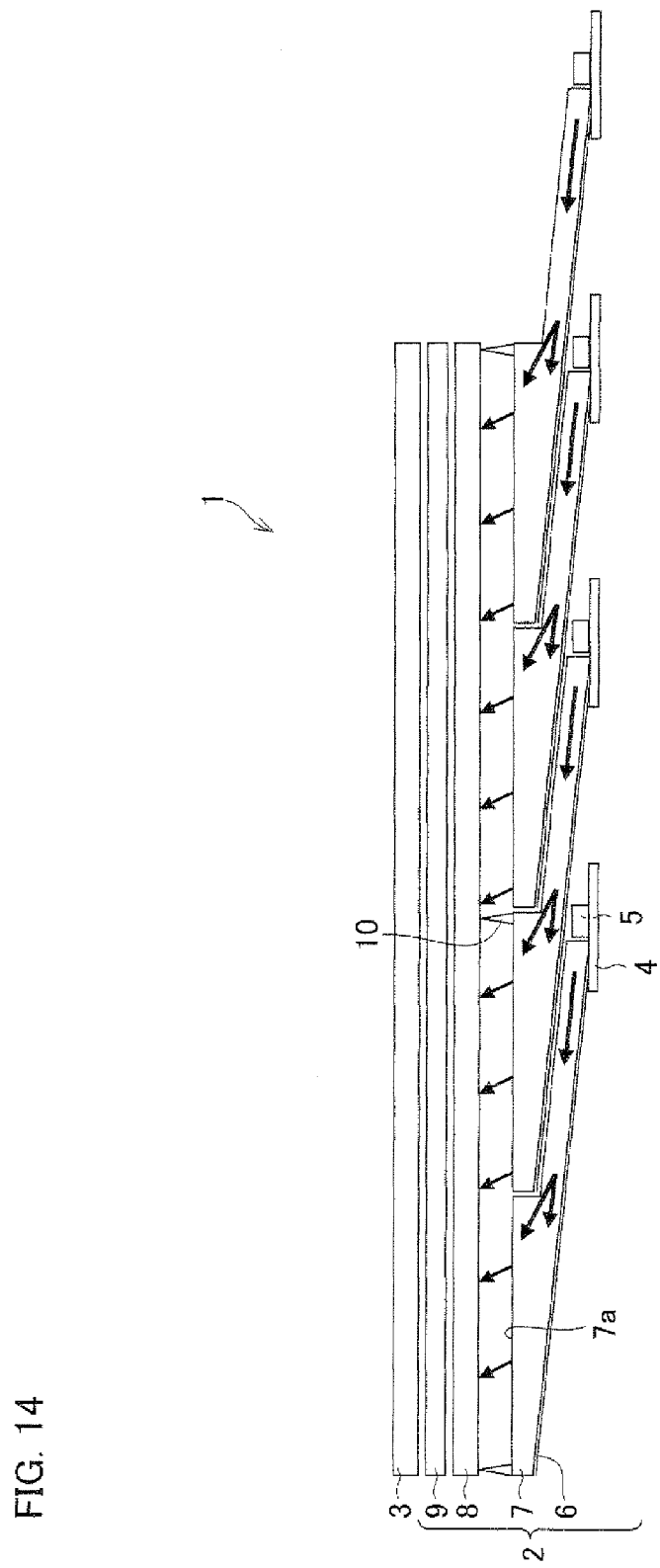
FIG. 14 is a cross-section view illustrating an arrangement corresponding to that of the liquid crystal display device shown in FIG. 1, the arrangement including fewer maintaining sections.
Figure 15:
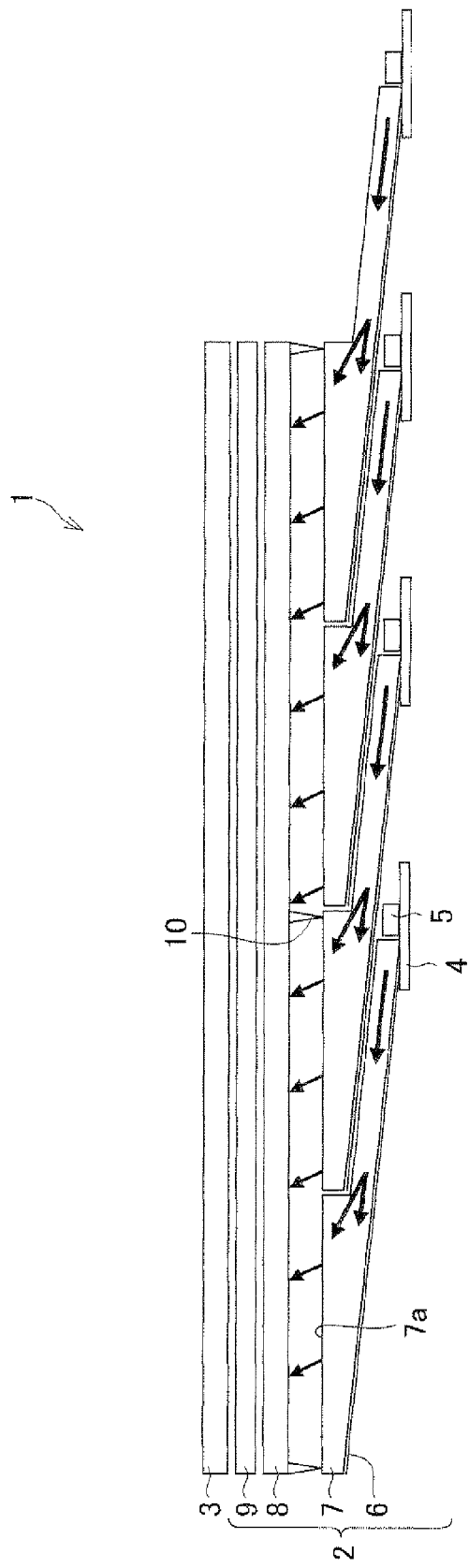
FIG. 15 is a cross-section view illustrating an arrangement corresponding to that of the liquid crystal display device shown in FIG. 6, the arrangement including fewer maintaining sections.
Figure 16:
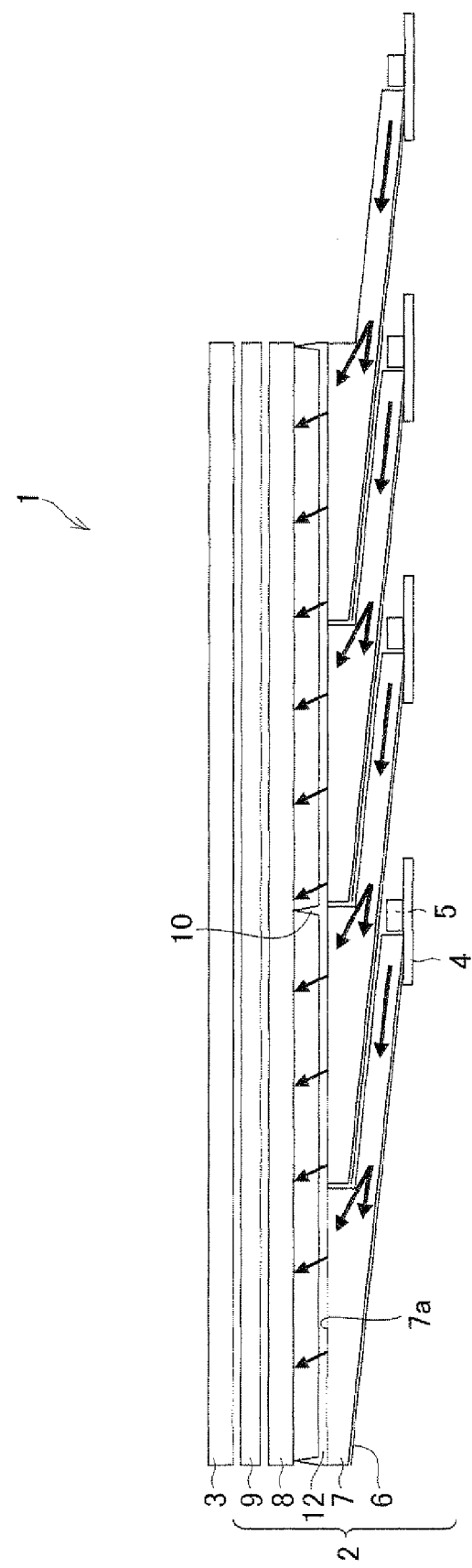
FIG. 16 is a cross-section view illustrating an arrangement corresponding to that of the liquid crystal display device shown in FIG. 7, the arrangement including fewer maintaining sections.

In the above configurations, the number of maintaining sections 10 provided on the light-emitting surface 7a is not particularly limited. At least one maintaining section 10 provided between the light-emitting surface 7a and the diffusing plate 8 suffices. FIGS. 14 through 16 illustrate arrangements corresponding to FIGS. 1, 6, and 7, respectively, the arrangements each having fewer maintaining sections 10 than its corresponding arrangement. Including fewer maintaining sections 10 as mentioned above allows a further reduction in the proportion of light emitted from the light-emitting surface 7a, the proportion being reflected by the maintaining sections 10. This further improves luminance uniformity and also allows the backlight 2 to be lighter.

As described above, the present embodiment includes at least one maintaining section 10 on a region of the light-emitting surface 7a, the region emitting a small amount of light. Further, the maintaining section 10 is so arranged as to maintain the distance between the light-emitting surface 7a and the diffusing plate 8.

When maintaining sections 10 are formed integrally with light guide plates 7, the total number of the maintaining sections 10 depends on the number of the light guide plates 7 because all the light guide plates 7 are preferably made in an identical shape. Thus, when the total number of the maintaining sections 10 is to be reduced, the maintaining sections 10 are preferably produced as members separate from the light guide plates 7. This improves the degree of freedom of design in positioning the maintaining sections 10 on the light guide plates 7.

In order to, for example, render the backlight 2 lightweight and prevent the light guide plate 7 from bending, it is preferable to provide, as shown in FIG. 5, two maintaining sections 10 on the step section 7d along its longitudinal direction.

Figure 17:
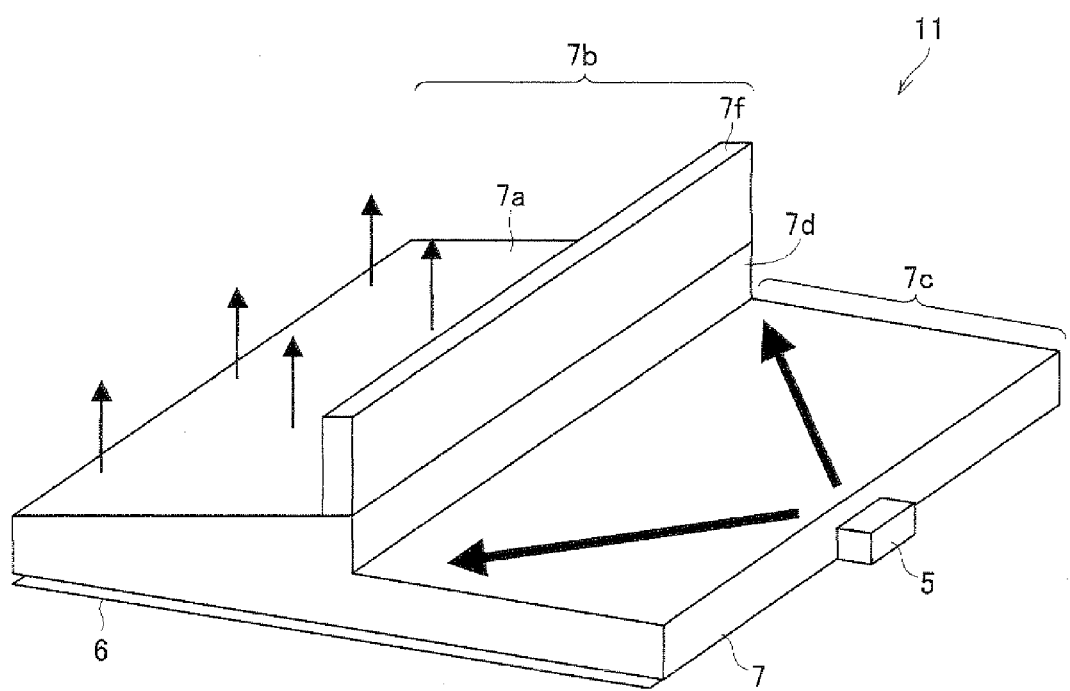
FIG. 17 is a perspective view schematically illustrating the configuration of a light guide plate unit including a maintaining plate.

The shape of the maintaining section 10 is not limited to a circular cone; for example, as shown in. FIG. 17, the maintaining section 10 may be replaced by a maintaining plate 7f protruding from the step section 7d in a constant thickness in the direction in which light is emitted. As in the above arrangements, the maintaining plate 7f may instead be positioned on a region corresponding to the end section opposite from the light source 5.

As described above, because the liquid crystal display device 1 of the present embodiment includes the backlight 2 as described above, this liquid crystal display device 1 can emit more uniform light to the liquid crystal display panel 3, thereby improving display quality.

Further, because the illumination device of the present embodiment has excellent luminance uniformity even in a case where its light-emitting area is large, it is particularly preferable that this illumination device is used as a backlight of a liquid crystal display device having a large screen. However, the present embodiment is not limited to this, and may be used as a backlight of any liquid crystal display panel.

As described above, an illumination device of the present embodiment is arranged such that each of the plurality of light guide plates includes: a light-emitting section having a part of the light-emitting surface; and a light guide section for guiding, to the light-emitting section, light from a corresponding one of the plurality of light sources, that a light-emitting section of one of any adjacent two of the plurality of light guide plates being provided above a light guide section of the other of any adjacent two of the plurality of light guide plates, that at least one maintaining section being provided between the light-emitting surface and the diffusing plate, the at least one maintaining section maintaining the predetermined distance, and that the at least one maintaining section being provided on a first end section or a second end section of each of the parts forming the light-emitting surface, the first end section being closer than the second end section to a corresponding light source, the second end section being farther than the first end section from the corresponding light source.

The above arrangement not only maintains the distance between the light-emitting surface and the diffusing plate, but also reduces the proportion of light emitted from the light-emitting surface, the proportion being reflected by the maintaining section. This in turn maintains the distance between the light guide plate and the diffusing plate, and also further improves luminance uniformity in comparison with conventional arrangements.

As described above, a liquid crystal display device of the present embodiment includes one of the illumination devices of the present as a backlight.

The above arrangement allows light to be emitted more uniformly onto the liquid crystal display panel. This improves display quality.

The embodiments and concrete examples of implementation discussed in the foregoing detailed explanation serve solely to illustrate the technical details of the present technology, which should not be narrowly interpreted within the limits of such embodiments and concrete examples, but rather may be applied in many variations within the spirit of the present technology, provided such variations do not exceed the scope of the patent claims set forth below.

The illumination devices of the present embodiment are each applicable as a backlight of a liquid crystal display device. In particular, the illumination devices of the present embodiment are each suitably applicable as a backlight of a large liquid crystal display device.

Reference Signs List

1 Liquid crystal display device
2 Backlight (Illumination device)
3 Liquid crystal display panel
4 Substrate
5 Light source (LED, Cold cathode fluorescent tube)
6 Reflecting sheet
7 Light guide plate
7a Light-emitting surface (of light guide plate)
7b Light-emitting section
7c Light guide section
7d Step section
7e Dark section
7f Maintaining plate
8 Diffusing plate
9 Optical sheet
10 Maintaining section
11 Light guide plate unit
12 Transparent plate
13 Prism (Light diffusing means)

The invention claimed is:

1. An illumination device comprising:
a plurality of light sources;
a plurality of light guide plates for causing surface emission of light from the plurality of light sources, respectively; and
a diffusing plate for diffusing light from the plurality of light guide plates, the diffusing plate being provided so as to be away, by a predetermined distance, from and face a light-emitting surface formed of the plurality of light guide plates,
each of the plurality of light guide plates including:
  a light-emitting section having a part of the light-emitting surface; and
  a light guide section for guiding, to the light-emitting section, light from a corresponding one of the plurality of light sources,
a light-emitting section of one of any adjacent two of the plurality of light guide plates being provided above a light guide section of the other of any adjacent two of the plurality of light guide plates,
at least one maintaining section being provided between the light-emitting surface and the diffusing plate, said maintaining section maintaining the predetermined distance,
said at least one maintaining section being provided so that only one maintaining section is provided on an end section of each of the parts forming the light-emitting surface, the end section being an end section far from a corresponding light source.

2. The illumination device according to claim 1, wherein:
a plurality of light diffusing elements for causing light to be emitted from the light-emitting surface of the plurality of light guide plates are provided on the light-emitting section of each of the plurality of light guide plates; and
the plurality of light diffusing elements are distributed so as to have an area density which varies depending on light emission amount of the light-emitting surface.

3. The illumination device according to claim 1, wherein said at least one maintaining section is provided so as to be integrated with (i) the plurality of light guide plates or (ii) the diffusing plate.

4. A liquid crystal display device comprising as a backlight an illumination device according to claim 1.

5. The liquid crystal display device according to claim 4, further comprising a liquid crystal display panel which faces the backlight.

6. The liquid crystal display device according to claim 5, wherein
the light from the plurality of light sources is transmitted through the plurality of light guide plates, emitted from the light-emitting surface, goes through the diffusing plate and an optical sheet, and reaches the liquid crystal display panel.

7. The illumination device according to claim 1, wherein said at least one maintaining section is made of a transparent resin.

8. The illumination device according to claim 1, wherein said at least one maintaining section has a tapering shape.

9. The illumination device according to claim 1, wherein said at least one maintaining section has a circular cone shape.

10. The illumination device according to claim 1, wherein a gap exists between (i) the light-emitting section of said one of any adjacent two of the plurality of light guide plates and (ii) the light-emitting section of the other of any adjacent two of the plurality of light guide plates.

* * * * *